Aug. 3, 1954

D. MacGREGOR 2,685,426

VALVE BODY WITH MATERIAL FLOW GUIDE
AND INCLINED SEAT STRUCTURE

Filed June 15, 1949

INVENTOR
David MacGregor
By Strauch & Hoffman
Attorneys

Aug. 3, 1954     D. MacGREGOR     2,685,426
VALVE BODY WITH MATERIAL FLOW GUIDE
AND INCLINED SEAT STRUCTURE
Filed June 15, 1949     2 Sheets-Sheet 2
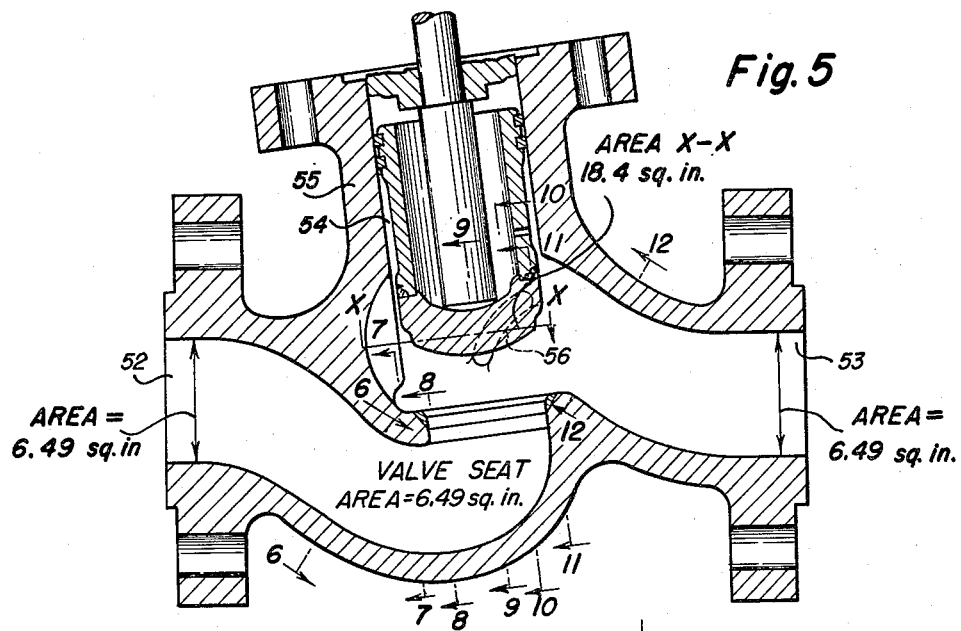
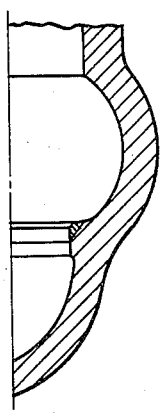
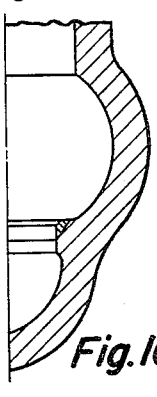
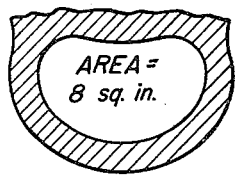
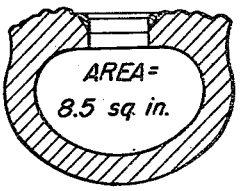
INVENTOR
David MacGregor
By Strauch & Hoffman
Attorneys Patented Aug. 3, 1954

2,685,426

UNITED STATES PATENT OFFICE 2,685,426

VALVE BODY WITH MATERIAL FLOW GUIDE AND INCLINED SEAT STRUCTURE

David MacGregor, East Chicago, Ind., assignor to Edward Valves, Inc., East Chicago, Ind., a corporation of Indiana Application June 15, 1949, Serial No. 99,280

11 Claims. (Cl. 251—118)

This invention relates to valves for the control of the flow of fluids at high pressure and high velocity, and in particular to an improved valve and body construction which reduces the friction losses in the fluid passing through the valve.

Among the common types of valves used for the control of the flow of high pressure fluid such as steam or the like, at high velocities, are those types of valves known as non-return valves and check valves. Both of these types of valves are characterized by the use of a closure formed by combined valve disk and piston, which is raised from the valve seat by the fluid pressure to allow the fluid to flow in one direction, but will automatically close by its own weight to prevent the flow of fluid in the reverse direction. Pressure on the discharge side of such valves, which would ordinarily cause a reverse flow, assists in closing this type of closure against its seat and holding it there. In the non-return type of valve, the opening of the valve closure is controllable by an exterior hand-wheel or the like so that the amount of fluid passing through the valve can be adjusted. A valve of such type is disclosed in my copending application Serial No. 662,340, filed April 15, 1946, now Patent No. 2,621,016. In a check valve, there is no exterior control to adjust the amount that the closure rises from its seat, so that under normal conditions the valve will rise to the end of its stroke and provide a full opening for the passage of the fluid. Such a check valve is disclosed in my copending application Serial No. 746,582, filed May 7, 1947, now abandoned.

In valves of either of the above two types, two general forms are common. The first type is usually known as the "globe" type, wherein the valve is placed in a straight length of pipe and wherein the fluid entering the valve body is substantially coaxial with the fluid leaving the valve body. The other type is usually known as the "angle" type, wherein the fluid leaves the valve at an angle of substantially 90° with respect to its entering direction, this type being customarily used where two pipes meet at a right angle and the valve body itself joins the two pipes.

In the valves of the types mentioned, which are described only as illustrative examples of valves to which my invention is applicable, the valve seat is normally in a horizontal plane and the axis of the movable valve piston or closure assembly is vertical. In accordance with my invention, I place the valve seat in a non-horizontal position such that the movement of the valve closure assembly, while still in a vertical plane, is inclined rearwardly or away from the outlet side of the valve body. By means of this construction, the closure presents less obstruction to the flow of the fluid through the body and because of the inclination of the bottom of the closure it directs fluid toward the outlet. The flowing fluid is fully effective to raise the closure to its uppermost position. In order to further provide an interior streamlining within the valve body and to guide the fluid towards the outlet in accordance with my invention, the guide vanes within the body which guide the closure in its movements towards and away from the seat, may be inclined towards the outlet of the valve body.

This application is a continuation-in-part of my copending application for Inclined Axis Valves, Serial No. 764,957 filed July 31, 1947, now abandoned, wherein the closure is shown as a disk which is closed against the valve seat. Integrally connected to the disk is a piston having substantially the same diameter as the disk, the connection being made by a cylindrical tube having a diameter substantially smaller than the disk or piston. The piston slides in a bore in the valve body, and when the disk is fully raised a second disk mounted on the tube closes the bottom end of the bore. With the aforesaid construction, as soon as the valve disk is raised from its seat and fluid pressure is built up on the other side of the seat, part of the pressure on the bottom of the disk is counter-balanced by pressure on the top of the disk, thus reducing the lifting effect of the pressure of the fluid on the bottom of the disk. Also, a ring is secured to the exterior of the cylindrical tube, so as to fully close the bottom of the bore to reduce fluid friction losses in this region when the closure is fully raised. In the improved construction disclosed herein, the closure is constructed so that the tube connecting the piston and the disk is substantially as large in diameter as the piston and disk, thus reducing to a minimum the counter-balancing pressure on the top of the disk when open, so that greater lift is obtained. Furthermore, the bore is always closed by this enlarged connecting portion irrespective of the position of the closure along its stroke and there is still less restriction to the flow of fluid through the valve.

It is therefore a primary object of my invention to provide an improved and novel construction and arrangement of a valve body and floating valve closure which presents a minimum of interference or resistance to the passage of fluid through the body, while at the same time the fluid is fully effective to raise the valve disk from its seat.

Another important object of my invention is the provision of an improved valve body and closure combination wherein the closure, while it is open, assists in directing the fluid flow towards the outlet of the valve body.

Another object is the provision of an improved valve and closure assembly wherein the closure assembly is so positioned when open as to deflect and guide the flowing fluid towards the outlet of the body, whereby the resistance to the flow of the fluid through the body is decreased.

Another object is the provision of a novel and improved valve body and closure wherein the bottom of the closure is inclined so as to guide the flowing fluid towards the outlet of the body, and wherein guide elements disposed within the body to guide the closure in its movements towards and away from its seat, are also disposed so as to assist in directing the flow of the fluid towards the outlet.

Other objects will become apparent as the description proceeds, in connection with the accompanying drawings, wherein:

Figure 5 is a longitudinal vertical section through a globe type non-return valve;

Figure 6 is a partial transverse section substantially along the line 6—6 of Figure 5;

Figure 7 is a partial transverse section substantially along the line 7—7 of Figure 5;

Figure 8 is a partial transverse section substantially along the line 8—8 of Figure 5;

Figure 9 is a partial transverse section substantially along the line 9—9 of Figure 5;

Figure 10 is a partial transverse section substantially along the line 10—10 of Figure 5;

Figure 11 is a partial transverse section substantially along the line 11—11 of Figure 5; and Figure 12 is a partial transverse section substantially along the line 12—12 of Figure 5.

Figure 1:
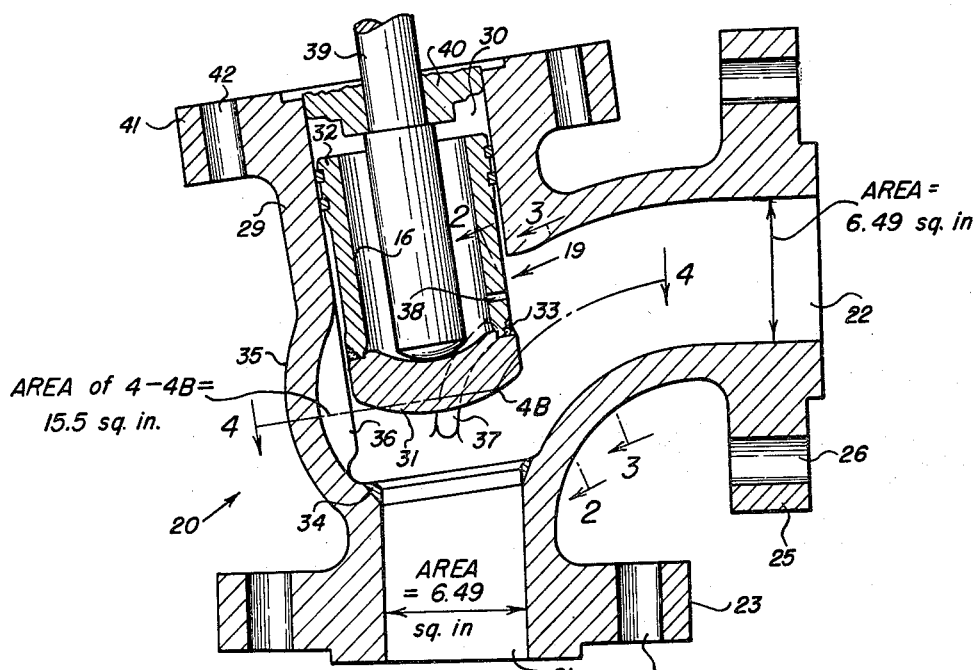
Figure 1 is a longitudinal vertical section through an angle type non-return valve, wherein the improved closure is employed.
Figures 2, 3:
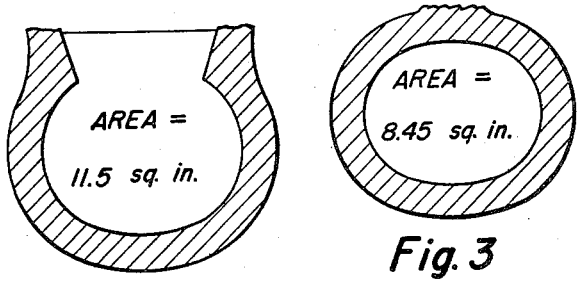
Figure 2 is a partial section substantially along the line 2—2 of Figure 1.
Figure 3 is a partial section substantially along the line 3—3 of Figure 1.

As shown in Figure 1, a valve body 20 of the angle type has an inlet passageway 21 and an outlet passageway 22, substantially at right angles to each other. A flange 23 having a series of spaced bolt holes 24, provides means for fastening the inlet portion of the valve body to a corresponding flange on the end of a pipe. A similar flange 25 and bolt holes 26 provide means for fastening the outlet end of the body 20 to a pipe at right angles to the first pipe. Means other than the flanged connections shown may be used to connect the valve body to the pipe. For example if the connections are to be welded the inlet and outlet may be provided with connections particularly designed for welding, as shown in my aforesaid application Serial No. 746,582. An integral tubular extension 29 extends from the valve body at a slight angle from the axis of the inlet passageway 21 and also makes an obtuse angle of 97° with the outlet passageway 22.

The tubular extension 29 has a central bore 30 through which may be inserted a closure assembly 19 comprising a valve disk 31 and spaced guiding piston 32. The piston 32 has a sliding fit in the bore 30 and is connected to the disk 31 by a tubular part 16 of reduced diameter to provide a slight clearance between the bore and said part. In the illustrated embodiment the piston 32 and part 16 are in one piece, with the part 16 welded to the disk 31 at 33 to form a single rigid unit. The body of the valve is enlarged at 35 between the inlet passageway 21 and the outlet passageway 22, as is apparent from Figures 1 and 4, in order to provide sufficient internal cross sectional area for the passage of the fluid despite the fact that part of the cross sectional area is occupied by the closure 19.

At the point of intersection of the axes of the central bore 30 and the inlet passageway 21, a valve seat 34 is provided, the seat being circular in the illustrated embodiments. The seat 34 does not protrude into the enlarged body of the valve, and does not obstruct the flow of the fluid toward the outlet 22. The plane of the valve seat is perpendicular to the aforesaid bore 30, so that the disk 31 and the seat 34 will be in engagement throughout their peripheries when the disk is closed against the seat.

Figure 4:
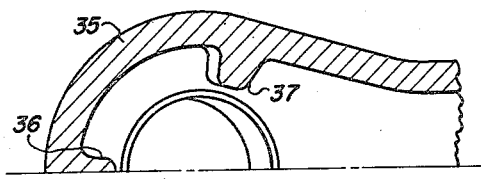
Figure 4 is a partial transverse section substantially along the line 4—4B—4 of Figure 1.

Within the enlarged portion 35 of the body and integral with the walls thereof, are provided three guide vanes, only two of which are shown at 36 and 37 in Figures 1 and 4. These guide vanes are arranged in substantially equiangularly spaced relation about the projected axis of the central bore 30, to guide the lower end of the closure 19 in its movements toward and away from the valve seat 34 to assure that the disk 31 will seat properly when the valve is closed. The piston 32 sliding in the bore 30, provides a spaced guide to insure the axial movement of the closure 19 during its travel.

The guide vane 36 lies in a substantially vertical plane but the vane 37 is curved toward the outlet passageway 22 as is shown in Figure 1, so that it assists in guiding the fluid toward the outlet passageway 22. The third guide vane, opposite to and similar to the vane 37, is disposed at a substantially equal distance from the other side of vane 36, and is inclined like vane 37 to deflect the fluid flow in the manner described. Those parts of the structure so far described are common to either a non-return valve of the type disclosed, or a check valve.

When forming part of a non-return valve, a valve stem 39 is guided by a bonnet 40, which is securely fastened to body extension 29 and suitably sealed with respect to the central bore 30 therein. A yoke, not shown, is attached to the flange 41 at the top of the tubular extension 29 as by means of bolts passing through the bolt holes 42 therein. The aforesaid yoke guides the upper end of the valve stem 39 and generally supports a hand-wheel or the like which can be turned to raise or lower the valve stem 39 to allow the closure 19 to rise from its seat under fluid pressure and permit the passage of fluid through the valve body, and also is effective to force the closure against the seat 34 and in opposition to the pressure of the fluid entering through the inlet passageway 21. The stem 39 passes through the piston 32 and bears against a coaxial seat in the upper surface of the valve disk 31, so that even if the valve stem 39 is in a raised position to permit the valve disk to open under the pressure of normally flowing fluid, the closure can fall of its own weight independently of stem 39 in the event that for some reason the flow of fluid should reverse direction or stop. A small hole 38 through the wall of the part 16 adjacent its lower end permits the drainage of condensate trapped inside the closure. If desired, an equalizer tube may be used to connect the upper end of the bore 30 with the outlet 22 in the manner disclosed in the copending application Serial No. 70,750 filed January 13, 1949, by Eldert B. Pool for "Valve Equalizer."

The details of construction of the valve stem 39, the bonnet 40, and the yoke, which is not shown, do not form any part of this invention, and as the invention is equally applicable to a check valve, these elements would not be used in the case of a check valve construction. Where the device is used as a check valve, the means for sealing and closing the upper end of the central bore 30 might advantageously be of the type shown in my aforesaid application Serial No. 746,582, although it will be understood that any suitable sealing means may be used.

Figure 1A:
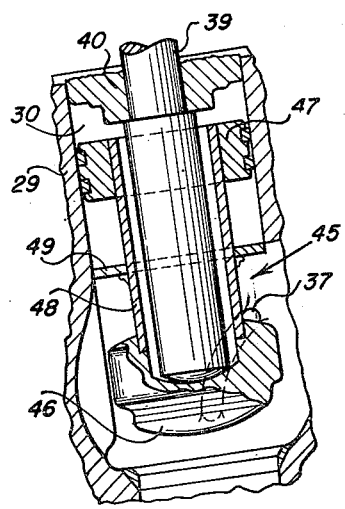
Figure 1a is a view of an alternate closure, as disclosed in my parent application Serial No. 764,957.

In Figure 1a is shown the construction of the closure as disclosed in my aforesaid parent application Serial No. 764,957. Here the closure assembly 45 comprises a valve disk 46, a guiding piston 47 and a connecting tubular element 48 between the disk and piston which, as shown, is considerably smaller in diameter than the piston 47. Thus, when the closure is raised, the lower end of the bore 30 forms a pocket around the tube 48. In order to close this pocket and better streamline the interior of the valve body when the closure is raised, a ring 49 is welded in the proper location on the tube 48, as also disclosed in my patent for Valve Constructions, Patent No. 2,621,015. Also, if desired, in lieu of ring 49 the piston 47 may be substantially elongated in the direction of the disk 46, as disclosed in my patent for Valve Construction. Patent No. 2,621,016, wherein the piston is of sufficient length so that, when the piston and disk assembly is at the top of its stroke, the bottom-most surface of the piston will seal the lower end of the bore 30 at its juncture with the interior of body portion 35 and outlet 22.

In order to further insure the streamlined passage of the fluid through the valve body with a minimum of pressure losses, the interior of the valve body is streamlined and the portions having different cross sectional areas are smoothly faired into one another so that there are no protuberances and so that the fluid can be directed smoothly from inlet to outlet.

As previously mentioned, the cross sectional area of the passageway through the valve body is greatly increased in the region normally occupied by the closure assembly in its open position, to provide a sufficient passageway for the fluid flow past it. In the drawings of Figures 1 to 4, which illustrate the angle type of valve, are shown the cross sectional areas at the inlet passageway 21 and outlet passageway 22, as well as at the sections 4—4B, section 2—2 and section 3—3. These dimensions are illustrative only and are not meant by way of limitation. A valve body having these relative dimensions would be normally used with pipes having an internal diameter of 2⅞ inches, which is the diameter of the inlet and outlet passageways 21 and 22.

Figures 5 to 12 illustrate the same principles as applied to a globe type of valve body of either the non-return type or the check type. In this case, the inlet passageway 52 and outlet passageway 53 are substantially coaxial at their ingress and egress ends respectively, and the central bore 54 within the tubular extension 55 lies in a common vertical plane with said passageways and makes an obtuse angle of 97° with the outlet passageway 53. It is to be understood that, as in the case of the angle type valve of Figures 1–4, this 97° angle is by way of illustration only and not a limitation, since it can vary within substantial limits and the unseated valve disk will still deflect the flowing fluid toward the outlet passageway 47.

Although drawn to a smaller scale, the globe type valve body of Figures 5 to 12 is also intended for use with a pipe having an internal diameter of 2⅞ inches, which is the diameter of the inlet passageway 52 and the outlet passageway 53. The sectional views of Figures 6–12 show the conformation of the passageways at various transverse sections through the valve body, and also give dimensions which are illustrative of suitable cross-sectional areas to provide a minimum obstruction to the flow of fluid through the valve body.

The inclination of the valve seat and closure assembly so that the disk directs the fluid towards the outlet passageway in the case of the globe valve of Figure 5, has all of the advantages of the similar inclination in the angle valves of Figures 1 and 1a. It will be apparent that the reverse inclination of the guide piston and the valve disk, so that the axis thereof makes an obtuse angle with the axis of the outlet passageway, assists in directing the flow of fluid to the outlet passageway and presents less obstruction to the passage of fluid through the valve body than is the case when the valve disk lies in either a horizontal plane, which is customary, or where it is so inclined that its axis of movement makes an acute angle of less than 90° with the outlet passageway. In each of the described types of construction, the seat contacting face of the valve disk portion of the closure is preferably convex or streamlined so as to offer a minimum of restriction to fluid flow. Also, by reason of the movement of the valve member at an obtuse inclination across the entrance to the outlet passage and in opposed relation to the ingress end of the inlet passage, the bottom face of the valve disk or member, when in open position, supplements the flow directing vanes on the valve body to immediately divert the major part of the entering fluid into the outlet passage, with a minimum of frictional resistance.

By means of this construction, I have provided a valve wherein obstruction to the free flow of fluid through the body is reduced. Free flow of fluid is further facilitated by the inclined guide vanes, such as shown at 37 in Figure 1 and at 56 in Figure 5, and the friction losses and obstruction to the flow of the fluid is reduced at the lower end of the central bores in the tubular extensions of the valve bodies by the described ring 49 or elongated piston when the valve disk of Figure 1a is raised from its seat. A ring such as 49 in Fig. 1a is not needed when the improved closure assembly shown in Figures 1 and 5 is used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a fluid control valve construction; a valve body having an inlet passage and a smoothly curving outlet passage, the axis of the outlet end thereof being substantially horizontal, the body being enlarged between said passages to provide a communicating passage of larger cross sectional area than said inlet and outlet passages, the walls of said passages being smoothly faired to reduce friction losses; means forming a frusto-conical annular valve seat substantially flush with said smoothly faired walls at the juncture of said inlet and communicating passages; a valve closure in said communicating passage operable to engage said seat to close said valve and to be shifted axially in a direction normal to the plane of said valve seat into said enlarged communicating passage to open said valve, the axis of said seat and of the movement of said closure being disposed at an angle with said substantially horizontal axis of said outlet passage, said closure having a smoothly curved convex bottom surface which when said closure is raised from said seat, is inclined with respect to said outlet passage to direct the fluid toward said outlet passage; and guide means engaged with the periphery of said closure to guide it in its axial movements, said guide means comprising curved vanes projecting from the surface of said communicating passage at opposite sides of said closure and inclined toward said outlet passage to direct the fluid thereto.

2. In a fluid control valve construction; a valve body having an inlet passage and a smoothly curving outlet passage, the axis of the outlet end thereof being substantially horizontal, the body being enlarged between said passages to provide a communicating passage of larger cross sectional area than said inlet and outlet passages, the walls of said passages being smoothly faired to reduce friction losses; means forming an annular valve seat in said smoothly faired walls substantially flush therewith at the juncture of said inlet and communicating passages, the upper surface of said seat being disposed at an acute angle with respect to said substantially horizontal axis of said inlet passages; and a valve closure in said communicating passage axially movable in a direction normal to the plane of said valve seat across the ingress end of said outlet passage to engage said seat to close said inlet passage and into said enlarged communicating passage to open said inlet passage, said closure having a smoothly curved convex bottom surface which when said closure is raised from said seat, is inclined with respect to said horizontal axis of said outlet passage to direct the fluid toward said outlet passage.

3. The valve construction described in claim 2 wherein said body has a bore opposite said seat and normal to the plane of said seat, and a piston slidable in said bore for the full stroke thereof to guide said closure in its movements, said piston being rigidly connected to said closure by an element constructed and arranged to seal the bottom of said bore when said closure is raised to open position.

4. The valve construction described in claim 2 wherein said body has a bore opposite said seat and normal to the plane of said seat; a guide means axially spaced from said closure and slidably mounted in said bore; and connecting means rigidly connecting said guide means and said closure, said connecting means being constructed and arranged to seal the bottom of said bore when said closure is raised.

5. The valve construction described in claim 2 wherein said body has a bore opposite said seat and normal to the plane of said seat; a guide means axially spaced from said closure and slidably mounted in said bore; and connecting means rigidly connecting said guide means and said closure, said connecting means comprising a sealing element spaced from said guide means and closure and sealing the end of the bore facing said valve seat in the open position of said closure.

6. The valve construction described in claim 3; and guide means within said enlarged portion and engaged with the periphery of said closure to guide it in its axial movements, said guide means comprising vanes projecting from the surface of said enlarged portion between the inlet and said bore and inclined toward said outlet passage to direct the fluid thereto.

7. The valve construction described in claim 2 wherein said body has a bore opposite said seat and normal to the plane of said seat; a guide means comprising a piston slidably mounted in said bore and connecting means rigidly connecting said piston and said closure, said connecting means including an annular element operable to close the end of the bore facing said seat when said closure is raised from said seat.

8. In the valve construction described in claim 7; guide means within said enlarged portion and engaged with the periphery of said closure to guide it in its axial movements, said guide means comprising curved vanes projecting from the surface of said enlarged portion between the inlet and said bore and clined toward said outlet passage to direct the fluid thereto.

9. A valve body comprising a fluid expansion chamber and having inlet and outlet passages communicating with said chamber, the axis of the outlet end of said outlet passage being substantially horizontal, the walls of said passages being smoothly faired to reduce friction losses; means forming an annular valve seat substantially flush with said smoothly faired walls and surrounding the inner end of said inlet passage, said seat being disposed in an inclined plane sloping downwardly and away from said substantially horizontal portion of said outlet passage; a valve guiding bore coaxial with said seat; and a plurality of flow directing and valve guiding vanes projecting internally from the walls of said expansion chamber, said vanes being inclined across the path of the entering fluid from a point adjacent the valve seat substantially to the ingress end of the outlet passage and directly diverting entering fluid from said inlet passage into the ingress end of said outlet passage.

10. In a fluid control valve construction; a valve body having inlet and outlet passages, each of said passages having a substantally horizontal portion, said body being enlarged between said passages to provide a communicating passage of larger cross sectional area than said inlet and said outlet passages, said inlet passage having a reversely curved section communicating with said enlarged body section, said outlet passage being smoothly downwardly curved from its ingress end to its egress end, the walls of said passages being smoothly faired to reduce friction losses; means forming an annular valve seat in said smoothly faired walls substantially flush therewith at the juncture of said inlet and communicating passages; a valve closure in said communicating passage operable to engage said seat to close said valve and to be shifted axially in a direction normal to the plane of said valve seat into said enlarged communicating passage to open said valve, the axis of said seat and the movement of said closure being disposed at an obtuse angle with the substantially horizontal egress end of said outlet passage, said closure having a smoothly curved convex bottom surface, which, when said closure is raised from said seat, is inclined with respect to said outlet passage to direct the fluid towards said outlet passage.

11. The fluid control valve according to claim 10 together with guide means engageable with the periphery of said closure to guide it in its axial movements, said guide means comprising curved vanes projecting from the surface of said communicating passage at opposite sides of said closure and inclined toward said outlet passage to direct the fluid thereto.

References Cited in the file of this patent

UNITED STATES PATENTS

| Number | Name | Date |
|---|---|---|
| 757,087 | Bower | Apr. 12, 1904 |
| 1,021,681 | Jennings | Mar. 26, 1912 |
| 1,519,668 | Costello | Dec. 16, 1924 |
| 1,918,544 | House | July 18, 1933 |
| 2,090,381 | Zagorski | Aug. 17, 1937 |
| 2,097,698 | Mohr | Nov. 2, 1937 |
| 2,269,404 | Haven | Jan. 6, 1942 |
| 2,321,597 | Hobbs | Jan. 15, 1943 |
| 2,598,224 | Clonts | May 27, 1952 |

FOREIGN PATENTS

| Number | Country | Date |
|---|---|---|
| 152,969 | Switzerland | of 1932 |